(12) United States Patent
Mittal et al.

(10) Patent No.: US 9,600,385 B2
(45) Date of Patent: Mar. 21, 2017

(54) ANALYZING BEHAVIOR OF A DEVICE UNDER TEST

(71) Applicant: Arrow Devices Pvt Ltd, Bangalore (IN)

(72) Inventors: Aditya Mittal, Bangalore (IN); Shrihari Voniyadka, Dakshina Kannada (IN)

(*) Notice: Subject to any disclaimer, the term of this patent is extended or adjusted under 35 U.S.C. 154(b) by 129 days.

(21) Appl. No.: 14/630,919

(22) Filed: Feb. 25, 2015

(65) Prior Publication Data

US 2015/0242296 A1    Aug. 27, 2015

(30) Foreign Application Priority Data

Feb. 25, 2014  (IN) .............................. 951/CHE/2014

(51) Int. Cl.
    *G06F 11/00*    (2006.01)
    *G06F 11/26*    (2006.01)
    *G06F 11/34*    (2006.01)

(52) U.S. Cl.
    CPC ........ *G06F 11/261* (2013.01); *G06F 11/3476* (2013.01); *G06F 2201/86* (2013.01); *G06F 2201/87* (2013.01)

(58) Field of Classification Search
    USPC ........................................................ 714/39
    See application file for complete search history.

(56) References Cited

U.S. PATENT DOCUMENTS

| | | | | |
|---|---|---|---|---|
| 4,250,562 A * | 2/1981 | Haag | ...................... | G06F 11/25 345/418 |
| 4,696,004 A * | 9/1987 | Nakajima | ............... | G06F 11/25 714/39 |
| 5,604,750 A * | 2/1997 | Levy | ................ | G01R 31/31908 324/762.02 |
| 5,764,657 A * | 6/1998 | Jones | ............. | G01R 31/318544 708/250 |
| 6,324,665 B1 * | 11/2001 | Fay | .................... | G01R 31/3193 714/724 |
| 6,499,132 B1 * | 12/2002 | Morley | ................. | G06F 17/504 714/38.13 |
| 6,553,500 B1 * | 4/2003 | Sterzik | ..................... | G06F 1/26 713/300 |

(Continued)

*Primary Examiner* — Amine Riad
(74) *Attorney, Agent, or Firm* — The Law Office of Austin Bonderer, PC; Austin Bonderer

(57) ABSTRACT

A method of analyzing behavior of a device under test includes obtaining event traces that include a current sequence trace and a reference sequence trace. The event traces include one or more transactions that include one or more properties. A list of relevant properties of one or more transactions is obtained. A first set of n-tuples including values of the relevant properties for the current sequence trace is extracted. A second set of n-tuples including values of the relevant properties for the reference sequence trace is extracted. The first set of n-tuples is compared with the second set of n-tuples to indicate one or more transaction indices corresponding to differences in transactions between the current sequence trace and the reference sequence trace. Transactions corresponding to the transaction indices are annotated to obtain annotated transactions. The current sequence trace and/or the reference sequence trace are displayed with the annotated transactions.

18 Claims, 9 Drawing Sheets

(56) References Cited

U.S. PATENT DOCUMENTS

| | | | | |
|---|---|---|---|---|
| 6,587,983 B1* | 7/2003 | Nakayama | ............ | G11C 29/56 714/736 |
| 6,920,583 B1* | 7/2005 | Morley | ................ | G06F 11/261 714/32 |
| 7,096,397 B2* | 8/2006 | Kundu | ................... | G11C 29/40 365/201 |
| 7,286,950 B2* | 10/2007 | Ozora | ................. | G01R 31/319 702/108 |
| 7,816,926 B2* | 10/2010 | Benedikt | ............... | G01R 27/32 324/637 |
| 7,984,345 B2* | 7/2011 | Ozawa | ............ | G01R 31/31932 365/201 |
| 8,627,156 B1* | 1/2014 | Erickson | ................ | H04L 1/244 714/707 |
| 2003/0004663 A1* | 1/2003 | Masella, Jr. | ... | G01R 31/318342 702/66 |
| 2006/0200708 A1* | 9/2006 | Gentieu | ................ | H04L 1/243 714/704 |
| 2006/0253748 A1* | 11/2006 | Brink | ..................... | H04L 1/244 714/715 |
| 2009/0271167 A1* | 10/2009 | Zhu | .................... | G06F 17/5027 703/14 |

* cited by examiner

S1: REFERENCE TRACE

| NO | TIME | DEVICE | DIR | SIZE |
|----|------|--------|-----|------|
| 1 | 1000 | BFM | RX | 0xe7 |
| 2 | 1010 | BFM | TX | 0xe8 |
| 3 | 1020 | DUT | RX | 0xe7 |
| 4 | 1030 | BFM | TX | 0xe8 |
| 5 | 1040 | BFM | RX | 0xe7 |

S2: CURRENT TRACE

| NO | TIME | DEVICE | DIR | SIZE |
|----|------|--------|-----|------|
| 1 | 1000 | BFM | RX | 0xe6 |
| 2 | 1010 | BFM | TX | 0xe8 |
| 3 | 1020 | DUT | RX | 0xe7 |
| 4 | 1030 | BFM | TX | 0xe7 |
| 5 | 1040 | BFM | RX | 0xe8 |
| 6 | 1050 | DUT | TX | 0xe6 |

FIG. 3B

| TRANSACTIONS | LABELS |
|---|---|
| ("RX", "BFM", "0XE6") | a1 |
| ("TX", "BFM", "0XE8") | a2 |
| ("RX", "BFM", "0XE7") | a3 |
| ("RX", "DUT", "0XE7") | a4 |
| ("TX", "DUT", "0XE6") | a5 |

300B

| REFERENCE | | | | |
|---|---|---|---|---|
| NO | TIME | DEVICE | DIR | SIZE |
| ☐ | | | | |
| ☐ | | | | |
| 1 | 1000 | BFM | RX | 'he7 |
| 2 | 1010 | BFM | TX | 'he8 |
| 3 | 1020 | DUT | RX | 'he7 |
| 4 | 1030 | BFM | TX | 'he8 |
| ☐ | | | | |
| 5 | 1040 | BFM | RX | 'he7 |

| CURRENT | | | | |
|---|---|---|---|---|
| NO | TIME | DEVICE | DIR | SIZE |
| 1 | 1000 | 1000 | RX | 'he6 |
| 2 | 1010 | 1010 | | 'he8 |
| 3 | 1020 | 1020 | RX | 'he7 |
| ☐ | | | | |
| 4 | 1030 | 1030 | RX | 'he7 |
| 5 | 1040 | 1040 | TX | 'he8 |
| 6 | 1050 | 1050 | TX | 'he6 |
| ☐ | | | | |

↳ 300D

FIG. 3D

ANALYZING BEHAVIOR OF A DEVICE UNDER TEST

BACKGROUND

Technical Field

The embodiments herein generally relate to electronic systems, and, more particularly, a system and method to analyze behavior of a computing device under test based on difference between event traces.

Description of the Related Art

Electronic systems are groupings of electronic circuits and components which are designed to accomplish one or more complex functions. The electronic systems which includes telecommunication systems, computer systems, power distribution systems, and electronic music systems. In a process of designing, complex electronic systems can be tested by different techniques. Technical specialists include engineers frequently implement large test-benches, test-suits, assertion suits and emulation systems that are employed to verify that the complex electronic systems meet specific requirements that are mandated as per a functional specification. The test-benches, test-suits, assertion suits and emulation systems may report an error whenever output of a computing device under test is not as per behavior specified by functional specification. The technical specialists have traditionally implements manual process using visual inspection of traces which are time consuming approach and error prone.

In order to debug errors, the engineers need to analyze the behavior of the system to conclude on why the device under test misbehaved. The analysis and conclusion may assist the engineers in fixing errors in the device under test. However, with the complexity of electronic systems increasing with each successive generation, time taken to analyze and debug issues is increasing exponentially. Hence, leads to loss of productivity for the users and associated teams. Accordingly, there remains a need for a new tool to assist users in quickly analyzing failures, increasing productivity, and efficiency of the electronic systems.

SUMMARY

In view of the foregoing, an embodiment herein provides a method of analyzing behavior of a device under test. The method includes obtaining from a device under test simulation model event traces that include a current sequence trace and a reference sequence trace. The event traces include one or more transactions that include one or more properties. A list of relevant properties of one or more transactions is obtained from a user from the one or more properties. A first set of n-tuples including values of the relevant properties for the current sequence trace is extracted. The n is equal to a number of the relevant properties, and a number of the first set of n-tuples is equal to a number of transactions.

A second set of n-tuples including values of the relevant properties for the reference sequence trace is extracted. The n is equal to a number of the relevant properties, and a number of the second set of n-tuples is equal to a number of transactions. The first set of n-tuples is compared with the second set of n-tuples to indicate one or more transaction indices corresponding to differences in transactions between the current sequence trace and the reference sequence trace. Transactions corresponding to the transaction indices are annotated to indicate the differences in the transactions to obtain annotated transactions. The current sequence trace or the reference sequence trace, or both the current sequence trace and the reference sequence trace is displayed with the annotated transactions.

Each of the first or second set of n-tuples may be given a unique name and character combinations. The character combinations may include one or more characters. A type of difference between the transactions of the current sequence trace and the reference sequence trace may be determined. The type of difference between the transactions may be indicated. A start time for the at least one event traces, and an end time for the at least one event traces may be recorded. The current sequence trace and the reference sequence trace are timed may include at least one time stamp. The current sequence trace may be converted into the reference sequence trace by minimizing number of operations required to transform one sequence into other sequence based on a shortest edit script or longest common subsequence algorithm. The operations may include start, insertion, or deletion of transactions from sequences to transform one sequence to another sequence.

In another embodiment, a computer implemented system for analyzing behavior of a device under test is provided. The system includes (i) a memory unit that stores (a) a set of modules, (b) a database, and instructions, wherein the database includes (i) information associated with a current sequence trace and a reference sequence trace, and (ii) a processor when configured by the instructions executes the set of modules. The set of modules include an event traces obtaining module, a properties obtaining module, a first n-tuples extracting module, a second n-tuples extracting module, a n-tuples comparing module, and a display module. The event traces obtaining module, executed by the processor, obtains event traces including a current sequence trace and a reference sequence trace. The properties obtaining module, executed by the processor, obtains a list of relevant properties of the plurality of transactions from the plurality of properties from a user. The first n-tuples extracting module, executed by the processor, extracts a first set of n-tuples including values of the relevant properties for the current sequence trace. The n is equal to a number of the relevant properties, and a number of the first set of n-tuples is equal to a number of transactions. The second n-tuples extracting module, executed by the processor, extracts a second set of n-tuples including values of the relevant properties for the current sequence trace. The n is equal to a number of the relevant properties, and a number of the second set of n-tuples is equal to a number of transactions. The n-tuples comparing module, executed by the processor, compares the first set of n-tuples with the second set of n-tuples to indicate one or more transaction indices corresponding to differences in transactions between the current sequence trace and the reference sequence trace. The display module, executed by the processor, displays the current sequence trace or the reference sequence trace at each of the transaction indices to indicate the differences in the transactions.

The set of modules may further include a transaction converting module and an annotating module. The transaction converting module that converts transactions of the current sequence trace into character combinations based on comparison between transactions of the current sequence trace and the reference sequence trace. The annotating module may annotate transactions corresponding to the transaction indices to indicate the differences in the transactions to obtain annotated transactions. The database further includes information associated with an untimed or a timed difference of the current sequence trace and the reference sequence trace. The event traces obtaining module may compare the current sequence trace and the reference sequence trace based on the least one of (i) the start time for the at least one event traces, and (ii) the end time for the at least one event traces. The event traces may be obtained from an emulation or a hardware prototyping system. The information from the emulation or the hardware prototyping system may be collected and processed in order to construct a new event trace. The event traces may be obtained by listening to a network socket or a stream or a data communication.

In yet another embodiment, one or more non-transitory computer readable storage mediums storing one or more sequences of instructions is provided, which when executed by one or more processors, causes obtaining, from a device under test simulation model, event traces that include a current sequence trace and a reference sequence trace. The event traces include a plurality of transactions that include one or more properties. A list of relevant properties of one or more transactions is obtained from a user from the one or more properties. A first set of n-tuples including values of the relevant properties for the current sequence trace is extracted. The n is equal to a number of the relevant properties, and a number of the first set of n-tuples is equal to a number of transactions.

A second set of n-tuples including values of the relevant properties for the reference sequence trace is extracted. The n is equal to a number of the relevant properties, and a number of the second set of n-tuples is equal to a number of transactions. The first set of n-tuples is compared with the second set of n-tuples to indicate one or more transaction indices corresponding to differences in transactions between the current sequence trace and the reference sequence trace. A type of difference between the current sequence trace meta string and the reference sequence trace meta-string is determined for each of the differences in the character combinations between the current sequence trace meta-string and the reference sequence trace meta-string. The current sequence trace or the reference sequence trace at each of the transaction indices is annotated and displayed to indicate the differences in the transactions to indicate the type of difference.

Each of the first or second set of n-tuples may be given a unique name and character combinations. The character combinations may include one or more characters. The current sequence trace and the reference sequence trace may be selected from a group including of (i) signal level traces, (ii) symbol level traces, (iii) protocol level traces, or (iv) combination thereof.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

With reference to FIG. 3A and FIG. 3B, FIG. 3A

DETAILED DESCRIPTION OF PREFERRED EMBODIMENTS

Figure 1:
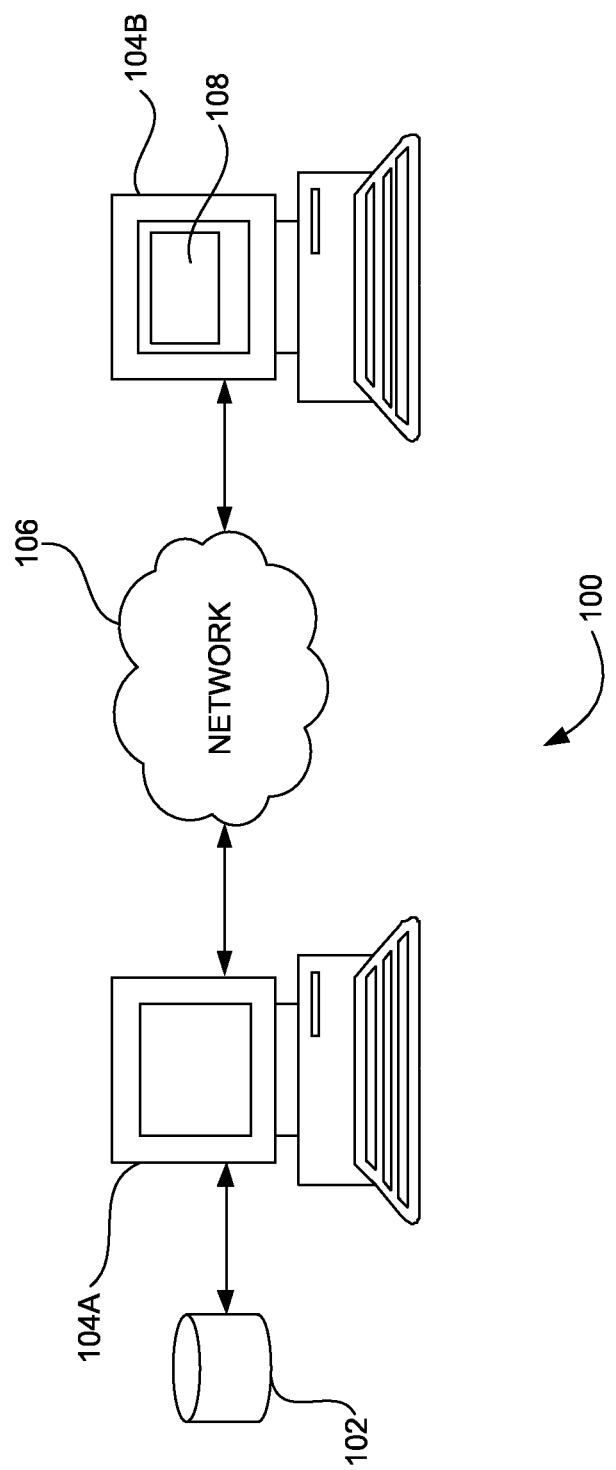
FIG. 1 illustrates a system view of a behavioral analysis of a device under test (DUT) simulation model based on a client application implemented within one or more computing devices according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a new tool to assist users in quickly analyzing failures, increasing productivity, and efficiency of the electronic systems. The embodiments herein achieve this by providing a client application that analyzes behavior of a computing device that is under test based on difference between one or more event traces. The client application supports a user to represent the one or more event traces in a form for comparison of the traces. A user may compare one or more event traces that form an input or an output of the system/device under test or its components or logic circuits. The client application compares and analyzes one or more event traces to show multiple difference outputs. Referring now to the drawings, and more particularly to FIGS. 1 through 6, where similar reference characters denote corresponding features consistently throughout the figures, these are shown preferred embodiments.

FIG. 1 illustrates a system view of a behavioral analysis of a device under test (DUT) simulation model 102 based on a client application 108 within one or more computing devices 104A-B according to an embodiment herein. The system view 100 includes the device under test (DUT) simulation model 102, the one or more computing devices 104A-B, a network 106, and the client application 108. The client application 108 obtains one or more event traces (e.g., a current sequence trace, and a reference sequence trace) as an input from the device under test (DUT) simulation model 102. In one embodiment, the current event trace and reference event trace might be generated from the same DUT simulation model or from two different simulation models. The client application 108 compares one or more event traces to identify differences that point to an issue/problem. In one embodiment, one or more event traces are signal level traces, symbol level traces, a protocol level traces, and combination thereof. In one embodiment, the device under test (DUT) simulation model and/or a device under test (DUT) emulation system interact with the one or more computing devices 104A-B for a behavioral analysis. In one embodiment, the one or more computing devices 104A-B acts as a host system for simulation, and the computing device 104B acts as an analytics system and vice versa.

In one embodiment, the event traces are a list of transactions. The transaction is a communicative action or activity involving one or more components of a system. The transaction properties are special quality or characteristics of a transaction (for e.g., such as size, direction, origin, address etc). In one embodiment, one or more event traces are timed (each event trace step carries as timestamp and two events are considered as not different when one or more identified attributes are same and the two events occur at the same timestamp) or untimed (two events are considered as not different when one or more identified attributes are same). In one embodiment, the client application 108 is implemented in the computing device 104A. In another embodiment, the client application 108 is implemented in the computing device 104B. The client application 108 interacts with the computing device 104B through the network 106 to analyze the behavior of one or more event traces. In one embodiment, the network 106 is an internet. In one embodiment, the one or more computing devices 104-B is a personal computer, a mobile phone, a smart phone, a tablet PC, a laptop, and an ultra-book, component chip of a system, a sub-component/logic circuit of the chip. The client application 108 represents the one or more event traces in a form that may allows comparison of event traces. The one or more event traces may be represented in a graphical representation. The client application 108 compares and analyzes the one or more event traces to show multiple difference outputs. In one embodiment, the one or more event traces are compared using different algorithms (e.g., a shortest edit script/longest common subsequence algorithm). The one or more differences associated with one or more event traces may be represented in a graphical representation. The one or more differences associated with one or more event traces are displayed to a user in the display unit (as shown in FIG. 3C). In one embodiment, one or more traces is obtained from an emulation or hardware prototyping system. The information from such a system can be collected and processed in order to construct the event trace. In one embodiment, the input traces are obtained from a file stored on a storage device such as a hard disk. In another embodiment, the input traces are obtained by listening to a network socket or stream. The examples are not exhaustive and the input may be obtained by other similar means of data communication. In one embodiment, the reference trace may be a golden, error free trace while the current trace may be the output of the DUT and might show incorrect behavior. The comparison between the reference trace and current trace and subsequent annotation of the current trace with the differences would help a user in identifying the cause of the abnormal behavior. In one embodiment, each element of the current trace or reference trace can be annotated as "addition" or "deletion" or "same" by the client application 108.

Figure 2:
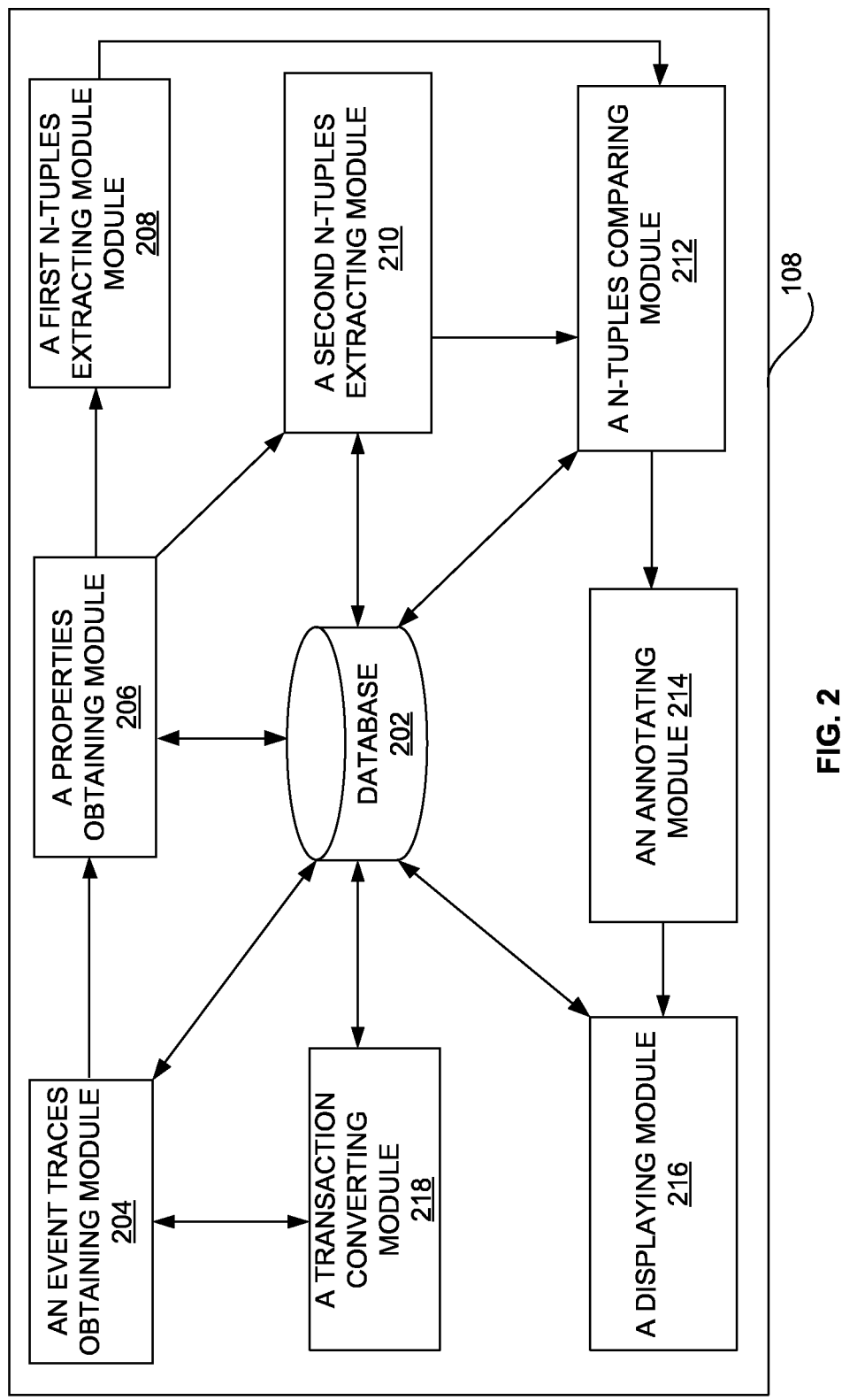
FIG. 2 illustrates an exploded view of the client application of FIG. 1 according to an embodiment herein.

FIG. 2 illustrates an exploded view of the client application 108 of FIG. 1 according to an embodiment herein. The exploded view 108 includes a data base 202, an event traces obtaining module 204, a relevant properties obtaining module 206, a first n-tuples extracting module 208, a second n-tuples extracting module 210, a n-tuples comparing module 212, an annotating module 214, a display module 216, and a transaction converting module 218. In one embodiment, a tuple is a data structure that has a specific number and sequence of elements. The database 202 stores information associated with a one or more event traces, and information associated with untimed/timed difference of event traces. The event traces obtaining module 204 comprises a current sequence trace and a reference sequence trace. The event traces obtaining module 204 comprises one or more transactions that comprise one or more properties. The one or more transactions include one or more first transactions and one or more second transactions. The one or more event traces may be compared based on a shortest edit script/longest common subsequence algorithm For example, given two traces, deleting and/or inserting trace elements such as transactions, packets, transfers, into specific part of a trace may convert one trace to another trace. The current sequence trace is converted into the reference sequence trace by minimizing the number of operations (insertion/deletion) required to transform one sequence into the other sequence based on computing the SES/LCS using a suitable algorithm. The relevant properties obtaining module 206 obtains a list of relevant properties of the one or more transactions from the one or more properties from a user. The user is presented with a list of properties that are relevant to a trace element. The user then selects which properties he considers as relevant for the computation of the difference. For example, a trace might consist of thousands of transactions, and each transaction might have 5 properties: source address, destination address, type, size and a sequence-number. The user might mark the source address, destination address, type and size properties as the relevant properties (leaving out sequence-number). The user might do this as every time the DUT is simulated, even though the traffic pattern between a source and destination address pair might be the same, but the starting value of the sequence-number might be different due to the functional requirements of the DUT. By marking the relevant properties, the user can make sure that any differences in the irrelevant properties (in this case, the sequence-number) does not show up as a difference in the output of the client application 108. In one embodiment, the first n-tuples extracting module 208 extracts a first number of n-tuples comprising value of the relevant properties for the current sequence trace. In one embodiment, n is equal to a number of the relevant properties of the one or more first transactions, and a number of the first number of n-tuples is equal to a first number of the one or more first transactions. The second n-tuples extracting module 210 extracts a second number of n-tuples comprising value of the relevant properties for the current sequence trace. In one embodiment, n is equal to a number of the relevant properties of the one or more second transactions, and the second number of n-tuples is equal to a second number of the one or more second transactions.

The a n-tuples comparing module 212 compares the first one or more n-tuples with the second one or more n-tuples to indicate one or more transaction indices corresponding to differences in transactions between the current sequence trace and the reference sequence trace. In one embodiment, an algorithm such as SES/LCS can be used to compute the differences. The algorithm will output "same", "addition" or "deletion" for every transaction index of the current or reference or both input traces. In one embodiment, the annotating module 214 annotates transactions corresponding to the transaction indices to indicate the differences in the transactions to obtain annotated transactions. The display module 216 displays the current sequence trace or the reference sequence trace or both alongside at each of the transaction indices to indicate the differences in the transactions.

Figure 3A:
FIG. 3B is an exemplary view illustrate an untimed differences of two traces according to an embodiment herein.
FIG. 3C illustrates a graphical representation of the two sequence traces according to an embodiment herein.
FIG. 3D is a user interface view illustrates one or more differences associated with the two sequence traces according to an embodiment herein.
Figure 3C:
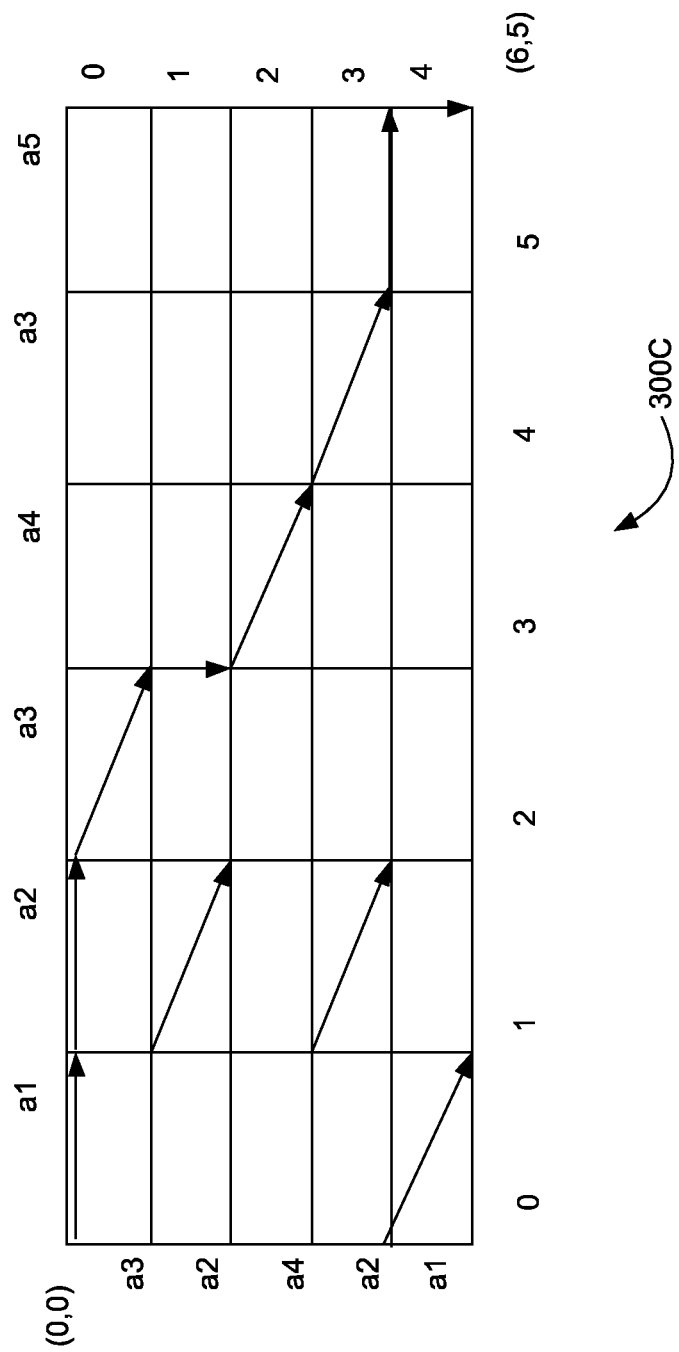

With reference to FIG. 3A and FIG. 3B, FIG. 3B is an exemplary view 300B illustrates an untimed differences of two traces according to an embodiment herein. The exemplary view 300A represents an example embodiment of untimed differences of two sequence traces (a current sequence trace, and a reference sequence trace). For example, considering two sequences to be S1, S2 as shown in FIG. 3A. For the given traces, the user specifies that he considers the Device, Dir (direction) and Size properties of the trace transactions as relevant and does not consider the time property as relevant. This would mean that if, due to some reason, the time stamps in the current trace change, when compared with the reference trace, the client application 108 will not show any difference only if the timestamps are different. The client application 108 will show a difference if some other relevant property of the transaction is also different. A first sequence S1 corresponds to the reference sequence trace. Similarly, a second sequence S2 corresponds to the current sequence trace. For simplification and conceptual clarity, every unique n-tuple is given a label such as a1, a2, a3, a4, a5 as shown in FIG. 3B. FIG. 3C shows the application of the SES/LCS algorithm to compute the differences between the two traces. The labels on the top horizontal axis correspond to the labels for the n-tuples for every transaction in the current trace and the labels on the left vertical axis correspond to the labels for the n-tuples for every transaction in the reference trace.

FIG. 3C illustrates the identification of differences 300C of the two sequence traces according to an embodiment herein. The representation 300B represents a shortest edit script (SES) graph. The SES algorithm will give a path from (0,0) to (6,5) such that it is composed of the least number of addition/deletion operations required to change one trace into the other trace. For example, a path is represented as (0, 0) to (6, 5) and an operation which includes insertion/ deletion of transactions from traces which converts one trace to another trace. The edit graph which represents one or more operations (e.g., match insert, delete) performed at corresponding path (0, 0) to (6, 5) for two sequence traces (e.g., S1 and S2). The one or more differences associated with the two sequence traces may be identified based on the edit script.

FIG. 3D is a user interface view 300D illustrates one or more differences associated with the two sequence traces according to an embodiment herein. The user interface view 300C displays one or more differences of the two sequence traces. In one embodiment, the one or more differences associated with the two sequence traces are represented one or more indication (e.g., one or more color code). For example, (i) a green color code that represents insertion of a transaction, (ii) a red color code that represents a deletion of a transaction, and (iii) a grey color code that represents modification in the reference sequence.

Figure 4:
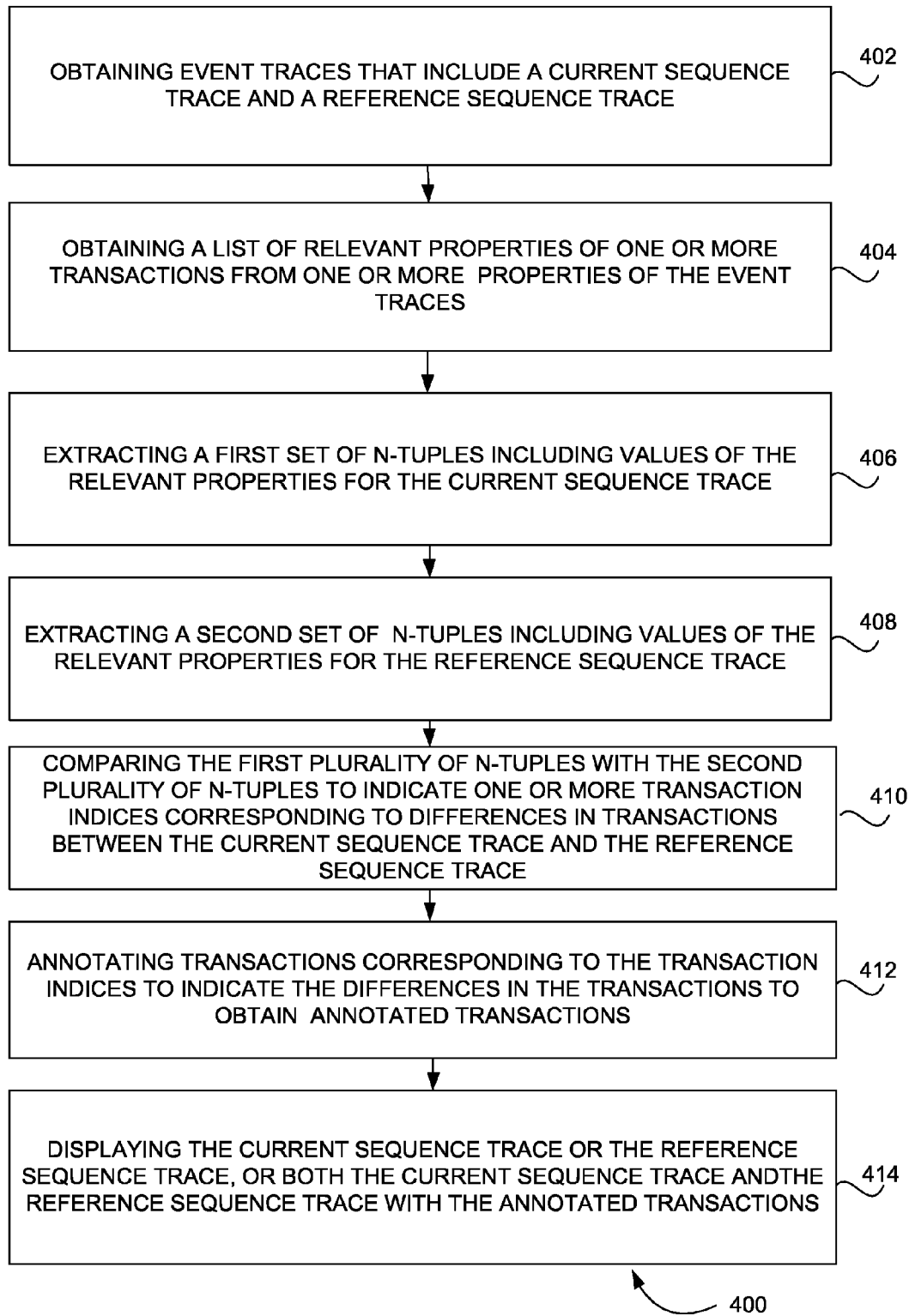
FIG. 4 is a flow diagram illustrating a method of analyzing behavior of the computing device under test based on difference between one or more event traces according to an embodiment herein.

FIG. 4 is a flow diagram 400 illustrating a method of analyzing behavior of the computing device under test based on difference between one or more event traces according to an embodiment herein. In step 402, event traces that include a current sequence trace and a reference sequence trace is obtained. In step 404, a list of relevant properties of one or more transactions from one or more properties of the event traces is obtained. In step 406, a first set of n-tuples including values of the relevant properties for the current sequence trace is extracted. In step 508, a second set of n-tuples including values of the relevant properties for the reference sequence trace is extracted.

In step 410, the first plurality of n-tuples with the second plurality of n-tuples to indicate one or more transaction indices corresponding to differences in transactions between the current sequence trace and the reference sequence trace is compared. In step 412, transactions corresponding to the transaction indices to indicate the differences in the transactions to obtain annotated transactions is annotated. In step 414, the current sequence trace or the reference sequence trace, or both the current sequence trace and the reference sequence trace with the annotated transactions is displayed.

Figure 5:
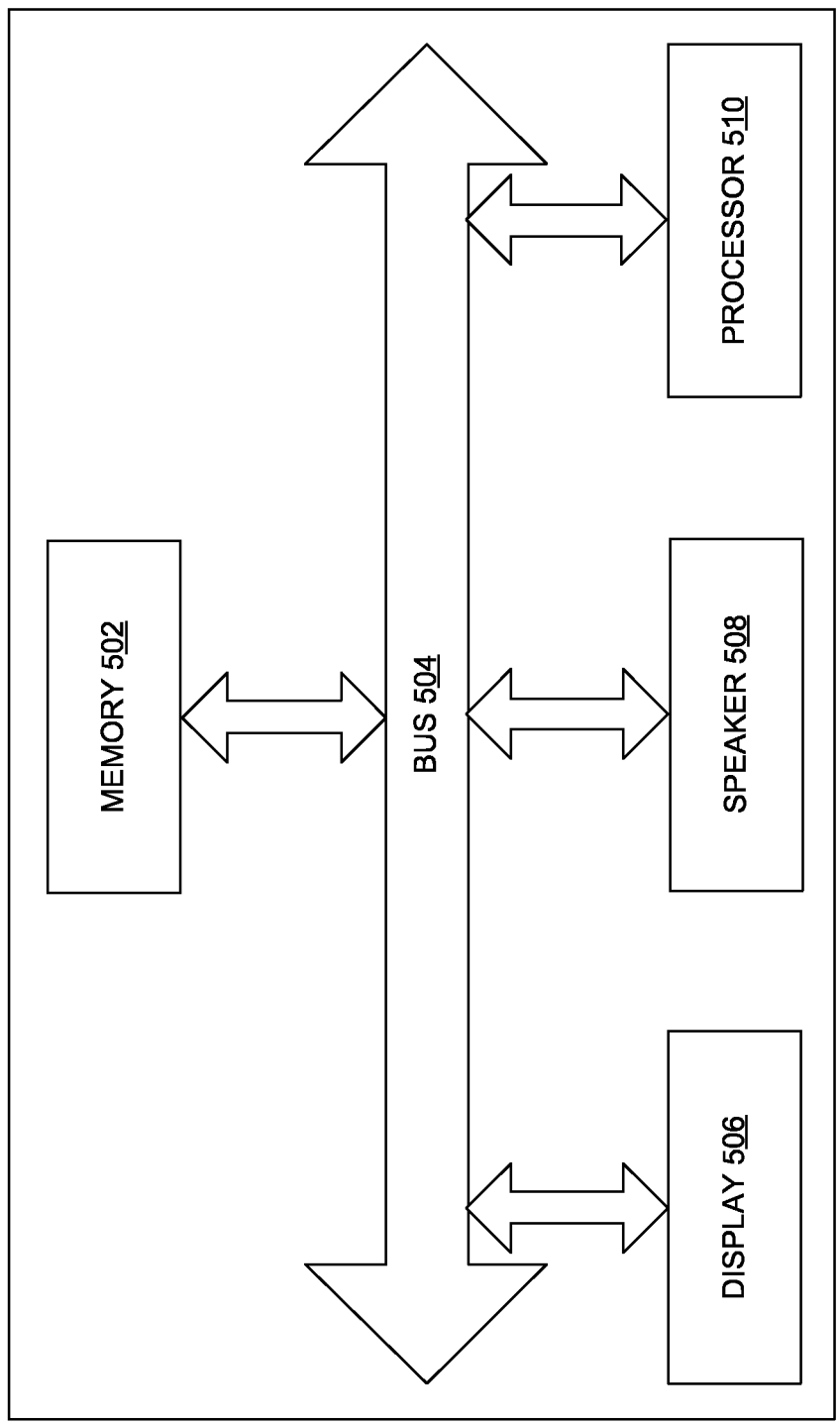
FIG. 5 illustrates an exploded view of the one or more computing devices according to the embodiments herein.

FIG. 5 illustrates an exploded view of the one or more computing devices 102A-B having an a memory 502 having a set of computer instructions, a bus 504, a display 506, a speaker 508, and a processor 510 capable of processing a set of instructions to perform any one or more of the methodologies herein, according to an embodiment herein. In one embodiment, the receiver may be the personal communication device. The processor 510 may also enable digital content to be consumed in the form of video for output via one or more displays 506 or audio for output via speaker and/or earphones 608. The processor 510 may also carry out the methods described herein and in accordance with the embodiments herein.

Digital content may also be stored in the memory 502 for future processing or consumption. The memory 502 may also store program specific information and/or service information (PSI/SI), including information about digital content (e.g., the detected information bits) available in the future or stored from the past. A user of the one or more computing devices 102A-B may view this stored information on display 506 and select an item of for viewing, listening, or other uses via input, which may take the form of keypad, scroll, or other input device(s) or combinations thereof. When digital content is selected, the processor 610 may pass information. The content and PSI/SI may be passed among functions within the one or more computing devices 102A-B using the bus 604.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly.

The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an n product. The n product can be any product that includes integrated circuit chips, ranging from toys and other low-n applications to advanced computer products having a display, a keyboard or other input device, and a central processor.

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
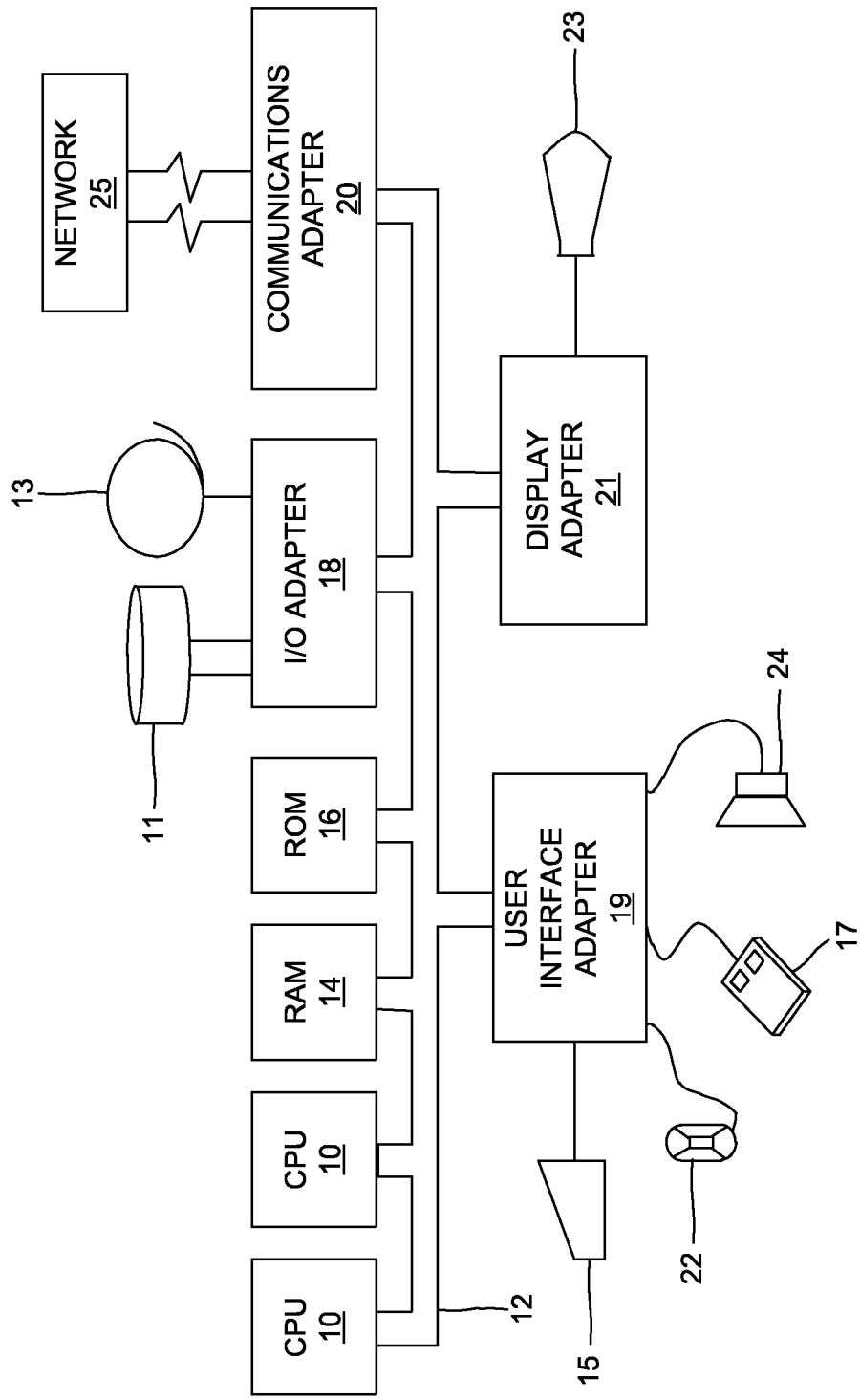
FIG. 6 is a schematic diagram of computer architecture used in accordance with the embodiment herein.

A representative hardware environment for practicing the embodiments herein is depicted in FIG. 6. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) or a remote control to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

A representation of an event trace may be as a string of a meta-alphabet based on the SES/LCS algorithm to the trace comparison problem. The client application 108 supports at least one of (i) reduction in npoints data structure size, (ii) reduction of a timed sequence to an untimed sequence to allow comparison between traces (otherwise exact time match is a problem), (iii) representation of a signal trace as a string of a meta-alphabet, (iv) show all possible paths by considering all possible arbitrary decisions between reference and current, (v) ability to choose trace sections (start/n markers) that need to be compared, and (vi) ability to get a golden trace from a golden model and compare the result of a test vector with the golden trace. The client application 108 enables users (e.g., an engineer) to analyze the behavior of a device under test and develop insights by easily comparing two traces. The system can couple the understanding of the functional specification and larger system requirements, which helps an engineer in narrowing down the possible issues in his/her design. The engineer can then proceed to work on eliminating the differences or understanding them in more detail to fix the design.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehend within the meaning and range of equivalents of the disclosed embodiments. It is to be understood that the p terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of analyzing behavior of a device under test, said method comprising:

obtaining, from a device under at least one of (i) test simulation model, and (ii) test emulation system, event traces that comprise a current sequence trace and a reference sequence trace, wherein said event traces comprise a plurality of transactions that comprise a plurality of properties, wherein said plurality of transactions comprise a plurality of first transactions of said current sequence trace and a plurality of second transactions of said reference sequence trace;

obtaining, from a user, a list of relevant properties for said plurality of first transactions and said plurality of second transactions from said plurality of properties, wherein a number of relevant properties for said plurality of first transactions and said plurality of second transactions is equal to n, wherein n is a natural number greater than 0 and is the same for both said current sequence trace and said reference sequence trace;

extracting a first number of n-tuples comprising values of said relevant properties of said plurality of first transactions of said current sequence trace, wherein said first number of n-tuples is equal to a first number of said plurality of first transactions;

extracting a second number of n-tuples comprising values of said relevant properties of said plurality of second transactions of said reference sequence trace, wherein said second number of n-tuples is equal to a second number of said plurality of second transactions, wherein said second number of n-tuples is not necessarily equal to said first number of n-tuples;

comparing said first number of n-tuples with said second number of n-tuples to indicate one or more transaction indices corresponding to differences in transactions between said current sequence trace and said reference sequence trace; and annotating transactions corresponding to said transaction indices to indicate said differences in said transactions to obtain annotated transactions; and displaying said current sequence trace or said reference sequence trace or both said current sequence trace and said reference sequence trace with said annotated transactions.

2. The method as claimed in claim 1, wherein each of said plurality of n-tuples is given a unique name and a character combinations, wherein said character combinations comprise one or more characters.

3. The method as claimed in claim 1, further comprising determining a type of difference between said transactions of said current sequence trace and said reference sequence trace.

4. The method as claimed in claim 3, further comprising indicating said type of difference between said transactions.

5. The method as claimed in claim 1, further comprising at least one of (i) a start time for said at least one event traces, and (ii) an end time for said at least one event traces which are recorded.

6. The method as claimed in claim 1, further comprising said current sequence trace and said reference sequence trace are timed comprises at least one time stamp.

7. The method as claimed in claim 1, wherein said current sequence trace is converted into said reference sequence trace by minimizing number of operations required to transform one sequence into other sequence based on a shortest edit script or longest common subsequence algorithm.

8. The method as claimed in claim 7, further comprising said operations comprises start, insertion, or deletion of transactions from sequences to transform one sequence to another sequence.

9. A computer implemented system for analyzing behavior of a device under test, said computer implemented system comprising:
(i) a memory unit that stores (a) a set of modules, (b) a database, and instructions, wherein said database comprises (i) information associated with a current sequence trace and a reference sequence trace, and
(ii) a processor when configured by said instructions executes said set of modules, wherein said set of modules comprises:
an event traces obtaining module, executed by said processor, that obtains event traces comprising a current sequence trace and a reference sequence trace, wherein said event traces comprise a plurality of transactions that comprise a plurality of properties, wherein said plurality of transactions comprise a plurality of first transactions of said current sequence trace and a plurality of second transactions of said reference sequence trace;

a properties obtaining module, executed by said processor, that obtains a list of relevant properties for said plurality of first transactions and said plurality of second transactions from said plurality of properties from a user, wherein a number of relevant properties for said plurality of first transactions and said plurality of second transactions is equal to n, wherein n is a natural number greater than 0 and is the same for both said current sequence trace and said reference sequence trace;

a first n-tuples extracting module, executed by said processor, that extracts a first number of n-tuples comprising values of said relevant properties of said plurality of first transactions for of said current sequence trace, wherein said first number of n-tuples is equal to a first number of said plurality of first transactions;

a second n-tuples extracting module, executed by said processor, that extracts a second number of n-tuples comprising values of said relevant properties of said plurality of second transactions of said reference sequence trace, wherein said second number of n-tuples is equal to a second number of said plurality of second transactions, wherein said second number of n-tuples is not necessarily equal to said first number of n-tuples;

a n-tuples comparing module, executed by said processor, that compares said first number of n-tuples with said second number of n-tuples to indicate one or more transaction indices corresponding to differences in transactions between said current sequence trace and said reference sequence trace; and a display module, executed by said processor, that displays said current sequence trace or said reference sequence trace at each of said transaction indices to indicate said differences in said transactions.

10. The computer implemented system of claim 9, wherein said set of modules further comprises a transaction converting module that converts transactions of said current sequence trace into character combinations based on comparison between transactions of said current sequence trace and said reference sequence trace.

11. The computer implemented system of claim 9, wherein said set of modules further comprises an annotating module that annotates transactions corresponding to said transaction indices to indicate said differences in said transactions to obtain annotated transactions.

12. The computer implemented system of claim 9, wherein said databases further comprises information associated with an untimed or a timed difference of said current sequence trace and said reference sequence trace.

13. The computer implemented system of claim 9, wherein said event traces obtaining module compares said current sequence trace and said reference sequence trace based on said least one of (i) said start time for said at least one event traces, and (ii) said end time for said at least one event traces.

14. The computer implemented system of claim 9, wherein said event traces is obtained from an emulation or a hardware prototyping system, wherein Information from said emulation or said hardware prototyping system is collected and processed in order to construct a new event trace.

15. The computer implemented system of claim 9, wherein said event traces is obtained by listening to a network socket or a stream or a data communication.

16. One or more non-transitory computer readable storage mediums storing one or more sequences of instructions, which when executed by one or more processors, causes obtaining, from a device under at least one of (i) test simulation model and (ii) test emulation system, event traces that comprise a current sequence trace and a reference sequence trace, wherein said event traces comprise a plurality of transactions that comprise a plurality of properties, wherein said plurality of transactions comprise a plurality of first transactions of said current sequence trace and a plurality of second transactions of said reference sequence trace;

obtaining, from a user, a list of relevant properties for said plurality of first transactions and said plurality of second transactions from said plurality of properties, wherein a number of relevant properties for said plurality of first transactions and said plurality of second transactions is equal to n, wherein n is a natural number greater than 0 and is the same for both said current sequence trace and said reference sequence trace;

extracting a first number of n-tuples comprising values of said relevant properties of said plurality of first transactions of said current sequence trace, wherein said first number of n-tuples is equal to a first number of said plurality of first transactions;

extracting a second number of n-tuples comprising values of said relevant properties of said plurality of second transactions of said reference sequence trace, wherein said second number of n-tuples is equal to a second number of said plurality of second transactions, wherein said second number of n-tuples is not necessarily equal to said first number of n-tuples;

comparing said first number of n-tuples with said second number of n-tuples to indicate one or more transaction indices corresponding to differences in transactions between said current sequence trace and said reference sequence trace;

determining a type of difference between said current sequence trace meta string and said reference sequence trace meta-string for each of said differences in said character combinations between said current sequence trace meta-string and said reference sequence trace meta-string; and annotating and displaying said current sequence trace or said reference sequence trace at each of said transaction indices to indicate said differences in said transactions to indicate said type of difference.

17. The non-transitory program storage device of claim 15, wherein each of said plurality of n-tuples is given a unique name and character combinations, wherein said character combinations comprise one or more characters.

18. The non-transitory program storage device of claim 15, wherein said current sequence trace and said reference sequence trace is selected from a group comprising of (i) signal level traces, (ii) symbol level traces, (iii) protocol level traces, or (iv) combination thereof.

* * * * *